United States Patent [15] 3,691,243
Fields et al. [45] Sept. 12, 1972

[54] ARYLATION OF OLEFINS

[72] Inventors: Ellis K. Fields, River Forest; Allen I. Feinstein, Wheaton, both of Ill.

[73] Assignee: Standard Oil Company, Chicago, Ill.

[22] Filed: Aug. 14, 1970

[21] Appl. No.: 63,928

[52] U.S. Cl. ............260/669 R, 260/621 R, 260/645, 260/669 QZ, 260/671 A
[51] Int. Cl. ..............................................C07c 15/10
[58] Field of Search ........260/669 R, 669 QZ, 671 A, 621 R, 260/645

[56] References Cited

UNITED STATES PATENTS 3,527,794  9/1970  Heck..........................260/669
3,574,777  4/1971  Heck..........................260/669

Primary Examiner—Curtis R. Davis
Attorney—Arthur G. Gelkins, Thomas L. Trinley and William T. McClain

[57] ABSTRACT

Reactions of nitro-aromatic compounds with olefins and diolefins is disclosed. When a nitro-aromatic is reacted with an olefin, the product is a vinyl-aromatic; for example, nitrobenzene and ethylene yields styrene. When a nitro-aromatic is reacted with a diolefin, the product is a fused ring, polycyclic aromatic; for example, nitrobenzene and butadiene yields naphthalene.

1 Claim, No Drawings

ARYLATION OF OLEFINS

This invention relates to a new method for arylating certain classes of mono- and di-olefins. The reactions of this invention are represented by the following general equations:

MONOOLEFIN REACTION SCHEME NO. 1:

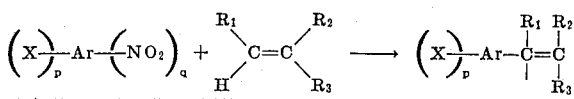

CONJUGATED DIOLEFIN REACTION SCHEME NO. 2:

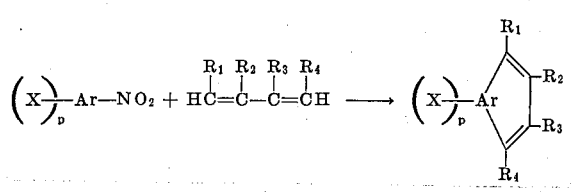

For the monoolefinic reactions as represented in reaction scheme No. 1 above, with respect to the nitro-aromatic compound the Ar group is a carbocyclic or hetrocyclic compound which is aromatic in character; X is a substituent such as alkyl for example, methyl, ethyl, propyl, and butyl; and iso-, secondary-and tertiary-alkyls such as isopropyl, t-butyl; halogenated alkyl such as trichloromethyl and trifluoromethyl; halo, such as fluoro, chloro, bromo, and iodo; hydroxy and alkoxy; amino and monoalkylamino and dialkylamine; mercapto and alkylthio; cyano, carboxy and ester groups; dicarboxylic acid anhydride groups; and acylamido groups; $p$ being an integer from 0to 4; and wherein $q$ is an integer from 1 to 3. The Ar group may be an aromatic carbocyclic radical such as benzene, fused carbocyclic compound, or a polyphenyl compound. The fused carbocyclic compounds having up to four rings are useful; preferred are those having two or three rings with up to 14 carbon ring-atoms. Such fused aromatic carbocyclic compounds include naphthalene, anthracene, phenanthrene, pyrene, chrysene, and rubrene. Polyphenyl structures useful are those from bi-phenyl and terphenyl. Heterocyclic compounds providing the nucleus for the nitro-compound or the co-reactant may be polycyclic or monocyclic. The hetero atoms are selected from oxygen, nitrogen and sulfur. The hetero rings of both the monocyclic and polycyclic types are 5- or 6-membered and are aromatic in character, i.e. - the hetero-rings are characterized as a closed, conjugated system. Conjugated in the sense that $\pi$ - electrons can be found at alternate positions around the ring either as the $\pi$ - electrons of the multiple bonds or the unshared electron pairs of the hetero atom. This structural requirement for "aromaticity" is well known to chemists and has been elucidated by Fieser and Royals, among others.

The aromatic polycyclic heterocycles providing nuclei for the present invention are further characterized as being limited to two–three rings, each ring being fused to at least one other. While most of the useful polycyclic heterocycles consist of a single hetero-ring fused to 1-2 benzene nuclei, compounds - such as 1,8-napthyridine - having all their rings heterocyclic undergo the reaction. This is so, I have discovered, because aromaticity - regardless of the nature of the ring atoms-imports the required stability. Exemplary of the useful polycyclic heterocycles are the nitrogen-containing quinoline, acridine, phenanthridine, benzopyrrole, dibenzopyrrole, benzimidazole, benzoxazole napthyridine; the oxygen-containing benzofuran, dibenzofuran and xanthene; the sulfur-containing benzothiophene, dibenzothiophene, dibenzothiophene and benzothiazole.

Useful aromatic monocyclic heterocycles include mono-hetero compounds as furan, thiophene, pyrrole, N-methyl pyrrole and yrpidine; and such all-nitrogen, aromatic polyazines as pyridazine, pyrazine, pryimidine and 1,3,5-triazine.

Additional examples of aromatic nitro compounds are nitrobenzene, p-nitrotoluene, 2- and 1-nitronaphthalene, nitroanthracene, nitrophenanthrene, nitropyrene, nitroacenaphthene; 2-, 3-, and 4-chloronitrobenzene; 2-, 3-, and 4-fluoronitrobenzene; 2-, 3- and 4-bromonitrobenzene; m-and p-dinitrobenzene; 1,3,5-trinitrobenzene; 3-, 4-nitro-o-xylene; p- and m-nitrobenzoic acid; methyl p- and m-nitro-benzoate; 3- and 4-nitrobenzonitrile; 3- and 4-nitrobenzotrifluoride; 3- and 4-nitrophenol; 3- and 4-nitroanisole; and 1,5-dinitronaphthalene, as well as nitroquinolines such as 5-nitroquinoline and 8-nitroquinoline.

Again with reference to scheme No. 1, the R groups substituting the monoolifinic structure may be hydrogen or the same or different alkyl, aryl, cycloalkyl, or heterocyclic radicals. Exemplary of these monoolefins are ethylene, propylene, isobutylene, styrene, α-methylstyrene, p-methylstyrene, p-dimethylstyrene, indene, 2-vinylpyridine, 2-vinyl naphthalene, 3-vinyl-pyridine, 4-vinylpyridine, acrylonitrile, and vinyl acetate. It is to be noted that one of the olefinic carbon atoms must be substituted with a hydrogen atom.

Products from the olefinic reactions are useful as monomers for polymerization to polymers for casting, molding, and films, and as intermediates for dyes, pharmaceuticals, and pesticides.

With reference to reaction scheme No. 2, the foregoing description of the aromatic nitro compound is applicable with the following exceptions: First, the compounds have only a single nitro substituent, and second, whereas the X substituents may be substituted on any position of the compound in the monoolefinic reactions, where diolefinic reactions are being run, at least one ring position ortho to the nitro group must remain unsubstituted, i.e.—there must be an ortho hydrogen atom.

The conjugated diolefins of the present invention have the following general formula

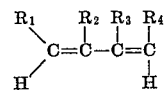

wherein the R groups are aliphatic, saturated hydrocarbons, containing up to 4 carbon atoms. Exemplary of such compounds are isoprene, 2,3-dimethyl butadene, 2-methyl 3ethyl butadiene. The products of the diolefinic reactions are useful as feedstocks for further oxidation to mono and carboxylic acids which in turn are useful components in plasticizers, polyesters, and polyamides. The reaction conditions for the process of this invention are as follows: the temperature is broadly 450°–700°C, preferably 600°–650°C; the molar ratio of olefin to nitro compound is broadly 1:1 to 50:1, preferably 2:1 to 10:1; reaction time may vary between 0.1 second to 10 minutes; the reaction is most suitably conducted in the presence of an inert gas such as nitrogen.

The following examples will illustrate the practice of the invention. Such examples are illustrative only and in no way do we intend to imply that they are co-extensive with the scope of this invention. Products were isolated by fractional distillation in vacuo and/or crystallization, and identified by boiling point, melting point, infrared and mass spectrometry, and by gas chromatography, by comparison of retention times with those of authentic samples.

Example 1

Nitrobenzene, 12.3g. (0.1 mole), was passed through a Vycor tube containing Vycor chips, heated in an electric furnace at 600° C, together with ethylene, (0.25 mole) flowing at 40 cc/min. Contact time was 12.5 seconds. The condensate, 7.55g., was distilled at 30 mm. pressure to obtain 2.52g. (24.1 percent) styrene and 3.15g. (33.4 percent) phenol.

Example 2

The reaction of Example 1 was repeated with ethylene (0.5 mole) flowing at 80 cc/min. and a contact time of 16 seconds. The yield of styrene was 28.4 percent and phenol, 14.6 percent.

Example 3

4-Fluoronitrobenzene, 14,1g. (0.1 mole), was passed through a Vycor tube containing Vycor chips, heated at 600° C, together with ethylene (0.3 mole) flowing at 40 cc/min.; contact time was 12.2 seconds. The condensate, 8.3g., was distilled at 30 mm. to obtain 1.46g. (12 percent) 4-fluorostyrene and 0.78g. (7 percent) 4-fluorophenol.

Example 4

4-Chloronitrobenzene, 15.85g. (0.1 mole) was passed through a Vycor tube containing Vycor chips, at 600° C together with ethylene (0.4 mole) flowing at 50 cc/min.; contact time was 15.5 seconds. The condensate, 11.8g, was distilled at 30 mm. to obtain 2.21g. (16 percent) 4-chlorostyrene and 0.77g. (6 1 percent) p-chlorophenol.

Example 5

Methyl m-nitrobenzoate, 8.25g. (0.05 mole) was passed through a Vycor tube containing Vycor at 600° C together with ethylene (0.5 mole) flowing at 60 cc/min.; contact time was 18.5 seconds. The condensate, 6.2g., was analyzed by gas chromatography; it contained a total of 3.2g. (39 percent) of methyl 3-vinylbenzoate and 0.27g. (4 percent) of methyl 3-hydroxybenzoate.

Example 6 m-Nitrobenzotrifluoride, 8.55g. (0.05 mole), was passed through a Vycor tube containing Vycor chips, at 600° C together with ethylene (0.5 mole) flowing at 60 cc/min.; contact time was 11.3 seconds. The condensate, 6.08g., was analyzed by gas chromatography and mass spectrometry; it contained 1.89g. (22 percent) of 3-vinylbenzotrifluoride and 0.73g. (9 percent) of 3-hydroxybenzotrifluoride.

Example 7

1-Nitronaphthalene, 8.65g. (0.05 mole) was passed through a Vycor tube containing Vycor chips, at 600° C together with ethylene (0.5 mole) flowing at 60 cc/min.; contact time was 15 seconds. The condensate, 4.1g., was distilled at 2 mm. to recover 1.34g. (17.4 percent) 1-vinylnaphthalene. From the distillation residue, by crystallization from methanol, was obtained 0.72g. (10 percent) α-naphthol.

Example 8

A mixture of 6.15g. (0.05 mole) of nitrobenzene and 26g. (0.25 mole) of styrene was passed through a Vycor tube containing Vycor chips, at 600° C under nitrogen flowing at 20 cc/min. with a contact time of 14 seconds. The condensate, 29.4g., was distilled in vacuo to recover 18.3g. of styrene; the residue was crystallized from 1.1 benzene : hexane to give 3.28g. (36.3 percent) of stilbene. The mother liquor, analyzed by gas chromatography - mass spectrometry, contained 1.57g. (17.4 percent) of 3- and 4-vinylbiphenyl.

Example 9

A mixture of 2.78g. (0.02 mole) of 4-nitrophenol and 10.4g. (0.1 mole) of styrene was passed through a Vycor tube containing Vycor chips, at 600° C under nitrogen flowing at 20 cc/min.; contact time was 21.8 seconds. The condensate was distilled in vacuo to recover 7.4g. of styrene; analysis of the residue showed 1.29g. (33 percent) of 4-hydroxyphenylstilbene and 0.64g. (16 percent) of 4-hydroxyphenyl styrene.

Example 10

A mixture of 6.15g. (0.05 mole) of nitrobenzene and 59g. (0.5 mole) α-methylstyrene was passed through a Vycor tube containing Vycor chips, at 600°C under nitrogen flowing at 20 cc/min.; contact time was 12.5 seconds. The pyrolysate, 61.7g., was distilled in vacuo to recover 43.4g. of α-methylstyrene; the residue (14.4g.) analyzed for 3.6g. (37 percent) of α-methylstilbene and 3.4g. (35 percent) of isopropenylbiphenyl.

Example 11

A mixture of 8.65g. (0.05 mole) of 5-nitroquinoline and 23.6g. (0.2 mole) of α-methylstyrene was passed through a Vycor tube containing Vycor chips, at 600° C under nitrogen flowing at 20 cc/min.; contact time, 11.4 seconds. The condensate, 27.8g., was distilled in vacuo to recover 16.4g. of α-methylstyrene. The residue analyzed for 2.21g. (18 percent) of 1-phenyl-1-methyl-2- (5-quinolyl) ethylene and 1.72g. (14 percent) of 5-(isopropenylphenyl) quinoline.

Example 12

A mixture of 6.15g. (0.05 mole) of nitrobenzene and 58g. (0.5 mole) of indene was passed through a Vycor tube containing Vycor chips, at 600° C under nitrogen flowing at 20 cc/min.; contact time, 20 seconds. The condensate was distilled to recover 36.2g. of indene; the residue, 13.6g., contained 4.53g. (47.3 percent) of phenylindene.

Example 13

A mixture of 2.46g. (0.02 mole) of nitrobenzene and 10.5g. (0.1 mole) of 4-vinylpyridine was passed through a Vycor tube containing Vycor chips, at 600° C with nitrogens flowing at 20 cc/min.; contact time was 9.5 seconds. The condensate was distilled to recover 6.7g. of 4-vinylpyridine; the residue, 4.5g., contained 1.48g. (41 percent) of 4-stilbazole by gas chromatographic analysis.

Example 14

A solution of p-nitrotoluene (6.86g., 0.05 mole) and isoprene (50 vol., 0.5 mole) was pyrolyzed at 600° C through a Vycor tube filled with Vycor chips. The reaction was carried out under pure dry nitrogen with a flow rate of 20cc/minute. The contact time was 11.2 seconds. The vapors were condensed in a flask at 0° C, and the condensate was distilled (36°–90° C) to recover unreacted material. The residue obtained after distillation (21.5g.) was analyzed by gas chromatography. The yield of 2-methylnaphthalene was 4.7 percent and dimethylnaphthalenes (50:50 mixture of the 2, 6 and 2, 7 isomers) was 15.0 percent.

Example 15

A solution of 4-nitro-o-xylene (7.55g., 0.05 mole) and isoprene (50 ml, 0.5 mole) was pyrolyzed at 600° C through a Vycor tube filled with Vycor chips with a nitrogen flow of 20cc/min. The contact time was 11.5 seconds. The reaction products were condensed in a flask at −60° C and distilled (34°–55° C) to give a distillate of 11.2g. and a residue at 140° C − 22.8g. The residue was analyzed by mass spectrometry and gas chromatography and contained 55.0 percent toluene, 67.1 percent xylene, 1.3 percent 2,6-dimethylnaphthalene, 6.2 percent 2,3,6-trimethylnaphthalene, and 6.0 percent 1,2,6 and 1,2,7-trimethylnaphthalenes.

Example 16

A solution of p-nitrotoluene (6.86g., 0.05 mole) and 2,3-dimethylbutadiene (56.4 ml, 0.5 mole) was pyrolyzed at 600° C through a Vycor tube under the conditions described above. The contact time was 12.3 seconds. The reaction mixture was distilled (60°–85° C) to give a distillate (18.2 g.) and a residue at 155° C of 21.4g. The residue was analyzed by mass spectrometry and gas chromatography, yielding 26.8 percent toluene, 20.0 percent xylene, 2.4 percent 2,6-dimethylnaphthalene, 1.2 percent 2,7-dimethylnaphthalene and 14.0 percent 2,3,6-trimethylnaphthalene.

Having described our invention, what we claim is:

1. A process comprising reacting ethene with nitrobenzene in an inert atmosphere at a temperature between 450° C to about 700° C for a sufficient time for reaction to occur, said co-reactants being present in amounts such that the molar ratio of ethene to nitrobenzene is about 1:1 to about 50:1.

* * * * *